Aug. 14, 1962  E. P. ARTHUR ET AL  3,049,118
ION ELECTRODE ASSEMBLY
Filed Feb. 3, 1961
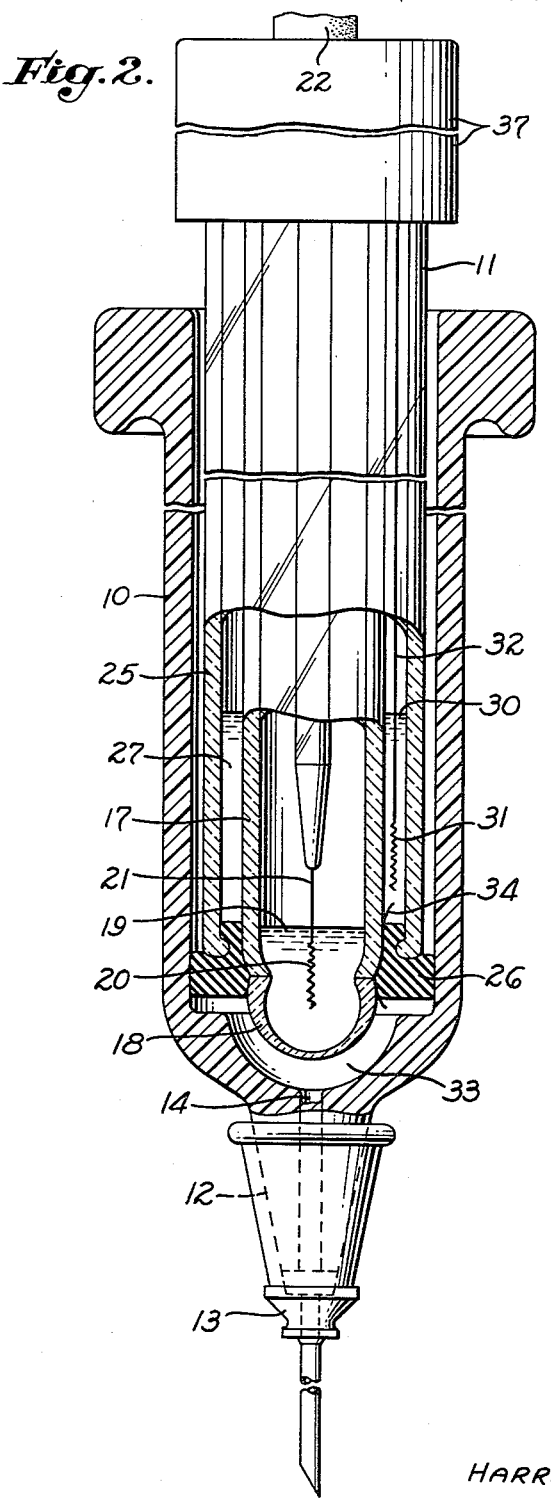
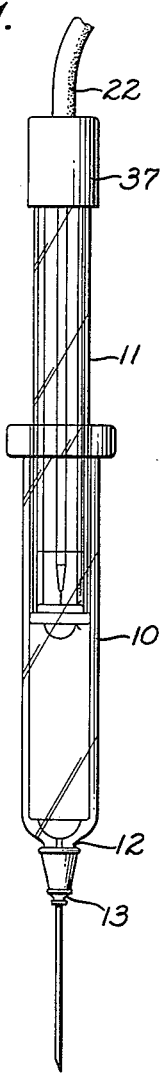
INVENTORS.
EDWIN P. ARTHUR
JOHN E. LEONARD
BY THEIR ATTORNEYS.
HARRIS, KIECH, RUSSELL & KERN

3,049,118
ION ELECTRODE ASSEMBLY
Edwin P. Arthur and John E. Leonard, Fullerton, Calif., assignors to Beckman Instruments, Inc., a corporation of California
Filed Feb. 3, 1961, Ser. No. 86,887
5 Claims. (Cl. 128—2)

This invention relates to electrode assemblies for ion potential measurement such as pH measurements and, in particular, to electrode assemblies suitable for anaerobic measurements in biological fluids such as blood and the like.

It is an object of the invention to provide an electrode assembly which may function with a very small quantity of sample. A further object is to provide such an electrode assembly that may be used with samples collected by a hypodermic needle and syringe, with the measurements being made directly in the syringe. A specific object of the invention is to provide an instrument in which the electrode system is a part of the syringe used for collecting the sample for analysis so that the sample does not have to be exposed to the atmosphere and does not have to be transferred to other containers for the measuring steps.

It is an object of the invention to provide an electrode assembly for measuring ion potential in small samples of blood or the like with the assembly having a syringe body adapted to receive a hypodermic needle at one end and a piston slidably positioned in the body for drawing the sample into the body through the needle, with the piston including a tubular case, an indicating electrode having an ion sensitive end, a first conductor for connecting the indicating electrode to one pole of a measuring circuit, seal means for sealingly supporting the indicating electrode within the case to provide an electrolyte space with the ion sensitive end of the indicating electrode exposed, a liquid junction providing electrolytic ionic communication between the electrolyte space and the exterior of the piston adjacent the sensitive end, and a reference electrode comprising an electrolyte in the electrolyte space, a half cell contacting the electrolyte, and a second conductor for connecting the half cell to the second pole of the measuring circuit. A particular object of the invention is to provide such an electrode assembly in which the indicating electrode is a conventional glass electrode having a membrane bulb as the ion sensitive end, with the membrane exposed at the end of the piston for contacting the sample.

It is another object of the invention to provide such a structure wherein the indicating electrode is centrally disposed within the tubular case of the piston providing an annular electrolyte space for the reference electrode. A further object is to provide such a structure wherein a seal ring positions the indicating electrode within the tubular case and closes the electrolyte space and also provides the sliding seal between the syringe piston and body.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:
FIG. 1 is a side view of a preferred embodiment of the invention; and
FIG. 2 is an enlarged partial sectional view of the instrument of FIG. 1.

The electrode body in the drawing includes a syringe body 10 and a piston 11. The body 10 is conventional in form and may be molded of glass or a clear plastic or other suitable material. A tapered end 12 is provided on the body for receiving a hypodermic needle 13. A passage 14 in the tapered end provides fluid communication between the needle and the interior of the body 10.

Both the indicating electrode and the reference electrode of the electrode system are carried in the piston 11. Various types of indicating or sensitive electrode structures may be used and a conventional pH glass electrode is shown in the embodiment of FIGS. 1 and 2.

The indicating electrode includes a glass stem 17 having an ion sensitive membrane 18 at one end. An electrolyte 19 is carried within the electrode and a half cell element 20 is immersed in the electrolyte and connected to the external measuring circuit through a conductor 21 and a cable 22. In a typical instrument, the half cell element 20 will be a silver-silver chloride mixture and the electrolyte 19 will be an aqueous solution of potassium chloride.

The indicating electrode is positioned within a tubular case 25 with the membrane end 18 projecting through an opening of an annular seal ring 26. In the embodiment shown herein, the seal ring performs several functions. It supports and locates the indicating electrode within the case 25. It also serves as a seal between the indicating electrode and case, providing an electrolyte space 27 for the reference electrode. The seal ring 26 also engages the inner wall of the body 10 to provide the sliding seal between the piston and body of the syringe. The seal ring also provides a support for the liquid junction between the reference electrode and the sample space. Silicone rubber is a preferred material for the resilient sliding seal 26, but other materials such as Teflon, nylon and rubber may be used, depending upon the characteristics of the particular fluids to be encountered.

The reference electrode includes an electrolyte 30 in the electrolyte space 27 with a half cell element 31 immersed in the electrolyte and connected to the measuring circuit through a conductor 32 and the cable 22. The half cell element 31 may be a silver-silver chloride mixture or a mercury-mercurous chloride mixture while the electrolyte is preferably an aqueous solution of potassium chloride. A liquid junction provides ionic communication between the electrolyte 30 of the reference half cell and the sample space 33 adjacent the exposed membrane of the end of the indicating electrode. A liquid junction is in the nature of a capillary, for example a thread or a fine bore tube. In the embodiment illustrated herein, the liquid junction comprises a thread 34 clamped between the indicating electrode and the seal ring 26, with the ends of the thread projecting into the electrolyte space 27 and the sample space 33. Various materials are used for liquid junction threads, including linen, asbestos, and glass fibers.

The upper end of the piston is closed with a cap 37 which is filled with a sealing composition such as asphalt or the like.

In use, the syringe is ordinarily charged with a neutral liquid which will not affect the particular measurement to be carried out. For example, in measuring pH of blood, a so-called normal saline solution is used. A charge of the solution is drawn into the syringe by moving the piston outward in the conventional manner. Then the syringe is oriented with the needle pointing upward and almost all of the solution is expelled by moving the piston to its full inward position. This operation also removes air bubbles from the interior of the syringe. Then the sample to be analyzed is drawn into the syringe through the needle by again moving the piston outward. It has been found that accurate and reproducible measurements of blood pH can be performed with the instrument of the invention using only a single drop of blood as a sample. One drop of blood has a volume of approximately 0.025 mililiter. This instrument permits anaerobic analysis of body fluids without requiring handling or transfer of the sample fluid from the sample gathering device. The instrument also permits analysis wtih extremely small samples, which is of particular importance in working with small animals in the laboratory.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In an electrode assembly for measuring ion potential in small samples of blood or the like, the combination of:
   an elongate syringe body adapted to receive a hypodermic needle at one end;
   and a piston axially slidable in said body for drawing a sample into the body through the needle, said piston including:
   a tubular case;
   an indicating electrode having an ion sensitive end;
   a first conductor for connecting said indicating electrode to a measuring circuit;
   seal means for sealingly supporting said indicating electrode within said case along the axis thereof to provide an electrolyte space, with said ion sensitive end adjacent an end of said case and exposed to the needle end of said body;
   a liquid junction providing ionic communication between said electrolyte space and the exterior of said piston adjacent said sensitive end;
   a reference electrode comprising an electrolyte in said electrolyte space, a half cell contacting said electrolyte, and a second conductor for connecting said half cell to the measuring circuit;
   and a cable projecting axially from the other end of said tubular case and containing said first and second conductors.

2. In an electrode assembly for measuring ion potential in small samples of blood or the like, the combination of:
   an elongate syringe body adapted to receive a hypodermic needle at one end;
   and a piston axially slidable in said body for drawing a sample into the body through the needle, said piston including:
   a tubular case;
   an indicating electrode having an ion sensitive end;
   a first conductor for connecting said indicating electrode to a measuring circuit;
   seal means for sealingly supporting said indicating electrode within said case along the axis thereof to provide an annular electrolyte space, with said ion sensitive end adjacent an end of said case and exposed to the needle end of said body;
   a capillary positioned between said seal means and said indicating electrode providing a liquid junction between said electrolyte space and the exterior of said piston adjacent said sensitive end;
   a reference electrode comprising an electrolyte in said electrolyte space, a half cell contacting said electrolyte, and a second conductor for connecting said half cell to the measuring circuit;
   and a cable projecting axially from the other end of said tubular case and containing said first and second conductors.

3. In an electrode assembly for measuring ion potential in small samples of blood or the like, the combination of:
   an elongate syringe body adapted to receive a hypodermic needle at one end;
   and a piston axially slidable in said body for drawing a sample into the body through the needle, said piston including:
   a tubular case;
   an indicating electrode having an ion sensitive end;
   a first conductor for connecting said indicating electrode to a measuring circuit;
   an annular, resilient seal positioned between said case and indicating electrode and projecting laterally beyond said case engaging said body to provide an annular electrolyte space within said piston and a sliding seal with said body, with said ion sensitive end adjacent an end of said case and exposed to the needle end of said body;
   a liquid junction providing ionic communication between said electrolyte space and the exterior of said piston adjacent said sensitive end;
   a reference electrode comprising an electrolyte in said electrolyte space, a half cell contacting said electrolyte, and a second conductor for connecting said half cell to the measuring circuit;
   and a cable projecting axially from the other end of said tubular case and containing said first and second conductors.

4. In an electrode assembly, the combination of:
   a glass electrode having an ion sensitive bulb at one end;
   a reference electrode comprising a half cell and an electrolyte;
   an elongate syringe body;
   a piston adapted for sliding movement in said body to draw in and expel samples, said piston being axially removable from said body opposite the sample inlet end thereof;
   means for supporting said glass electrode within said piston with said bulb exposed at the sample end of said piston;
   means for containing said reference electrode within said piston;
   a liquid junction providing ionic communication between said electrolyte and the exterior of said piston adjacent said bulb;
   and a cable carried by and axially extending from said piston and containing conductors for connecting said glass and reference electrodes to a measuring circuit.

5. In an electrode assembly for measuring ion potential in small samples of blood or the like, the combination of:
   an elongate syringe body adapted to receive a hypodermic needle at one end;
   and a piston axially slidable in said body for drawing a sample into the body through the needle, said piston being axially removable from said body opposite the needle end thereof, said piston including:
   a tubular case;
   an indicating electrode having an ion sensitive end;
   an annular, resilient seal positioned between said case and indicating electrode supporting said indicating electrode within said case and providing an annular electrolyte space therebetween, with said seal projecting laterally beyond said case engaging said body to provide a sliding seal with said body, with said ion sensitive end adjacent an end of said case and exposed to the needle end of said body whereby said indicating electrode moves away from said needle end as the sample is drawn into said body;
   a liquid junction providing ionic communication between said electrolyte space and the exterior of said piston adjacent said sensitive end;

a reference electrode comprising an electrolyte in said electrolyte space and a half cell contacting said electrolyte;

and a cable carried by and axially extending from said piston and containing conductors for connecting said indicating and reference electrodes to a measuring circuit.

References Cited in the file of this patent

UNITED STATES PATENTS

| | | |
|---|---|---|
| 2,755,243 | Beckman | July 17, 1956 |
| 2,886,771 | Vincent | May 12, 1959 |